June 5, 1956
B. G. COPPING
2,748,982
BEVERAGE DISPENSING APPARATUS
Filed Aug. 23, 1951
3 Sheets-Sheet 1
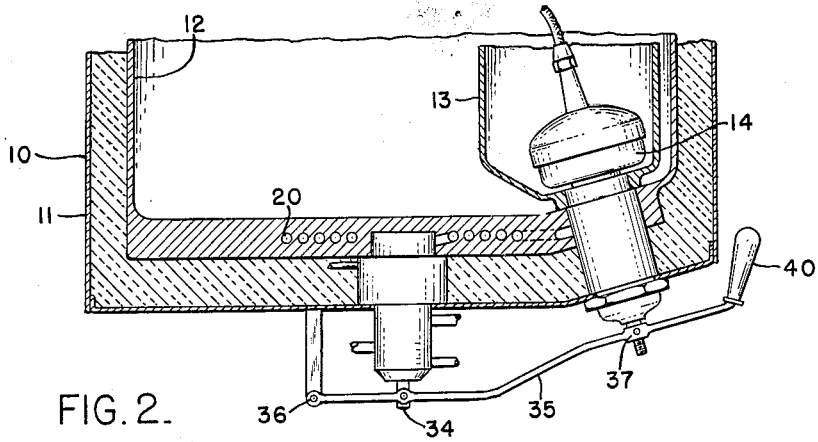
FIG. 2.
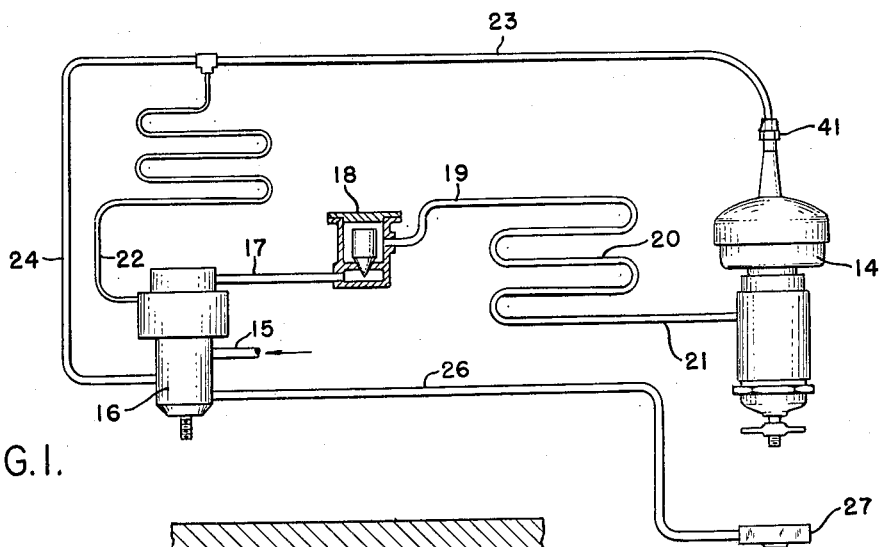
FIG. 1.
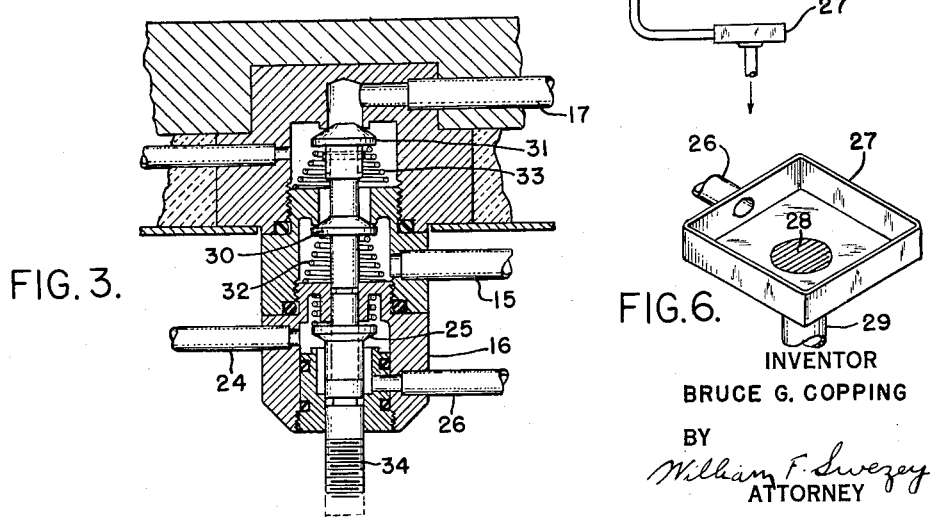
FIG. 3.
FIG. 6.
INVENTOR
BRUCE G. COPPING
BY
William F. Swezey
ATTORNEY INVENTOR
BRUCE G. COPPING
BY
William F. Swezey
ATTORNEY 2,748,982
Patented June 5, 1956

2,748,982
BEVERAGE DISPENSING APPARATUS

Bruce G. Copping, Akron, Ohio

Application August 23, 1951, Serial No. 243,265

4 Claims. (Cl. 222—108)

This invention relates to beverage dispensing apparatus and particularly to apparatus of the type wherein a flavoring concentrate and a diluent such as water, either plain or carbonated, are supplied to the dispenser from separate sources and are thoroughly mixed therein prior to being dispensed.

The concentrate, which may be a fruit juice or a conventional sugar syrup, is stored under atmospheric pressure in a refrigerated container located in or closely adjacent the dispenser assembly. The diluent, which may be plain or carbonated water, is supplied through a suitable conduit from a source under pressure. If it is plain water it may come directly from the city water system and if it is to be carbonated it may be passed through a suitable carbonator. Alternatively, the water may come from any pressure source such as a tank under pressure or from a pump.

A predetermined quantity of the concentrate is pumped from its container by a pump operated in response to the pressure of the water flowing to the dispensing nozzle. This nozzle is so constructed that the concentrate and water are thoroughly mixed while flowing through the nozzle with the result that the beverage dispensed by the nozzle is a uniform mixture of concentrate and water.

Because the concentrate pump is operated in response to the pressure of the water flowing to the nozzle, it is apparent that the flow of concentrate and water are so proportioned to each other that a uniform mixture having a predetermined ratio of concentrate to water is dispensed whenever the dispenser is operated.

A separate valve structure is provided in the system for controlling the flow of water therethrough and this structure is interconnected with the nozzle-controlling valve so that when the latter is opened to dispense the beverage, the water controlling valve is also opened to allow water to flow from its source under pressure to the dispensing nozzle and also, by a suitably arranged by-pass, to operate the concentrate pump.

When the valve at the dispensing nozzle is closed the flow of water to the system is interrupted, the concentrate pump is automatically refilled, as hereafter described, and the water used to operate the concentrate pump is discharged through suitable conduits and a controlling valve to the cup platform where it serves to flush that platform and assist in removing any portion of the beverage which may have been spilled. Alternatively the waste water may be led directly to the drain.

The concentrate pump may be of any suitable pressure-operated type but is preferably a diaphragm pump. The dispensing nozzle is here shown as comprising a single spiral or helical passage in which the concentrate and water are admitted at one end and, after being thoroughly mixed in the passage through the spiral channel, emerge at the other end as the beverage to be dispensed.

The concentrate is stored adjacent a refrigerant source which may be ice or the cooling coil of a mechanical refrigerating system. Likewise the water is precooled by being passed through a pre-cooler also disposed adjacent and in thermal contact with the same refrigerating source.

A primary object of the invention is to provide a beverage dispenser having the advantages heretofore described.

A further object is to provide an improved pump structure particularly adapted for a beverage dispenser.

Still another object is to provide an improved nozzle structure for dispensing a uniformly mixed beverage having at least two separate components.

Other objects and advantages will be apparent from the following description and accompanying drawings wherein:

Fig. 1 is a schematic diagram of a dispensing system embodying my invention.

Fig. 2 is a fragmentary view, partly in section, through the lower part of the dispenser unit and showing the outline of the concentrate pump and nozzle assembly and the water control valve assembly as well as the operating lever.

Fig. 3 is a vertical section through the water control valve assembly shown in outline in Fig. 2.

Fig. 6 is a perspective view of the cup platform.

Figure 4:
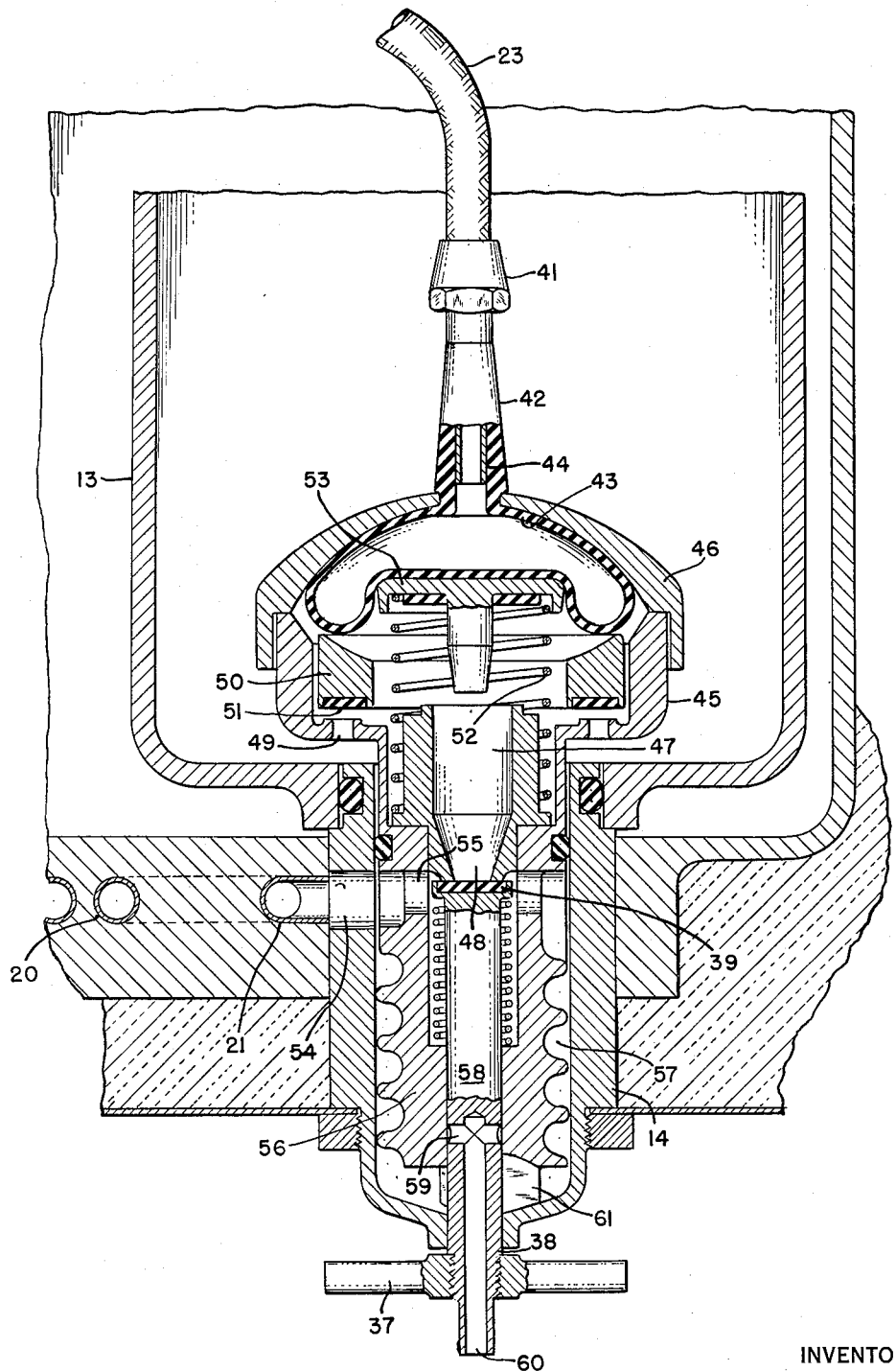
Fig. 4 is a vertical section on an enlarged scale through the concentrate pump and nozzle assembly, including adjacent parts of the dispenser, with the pump diaphragm collapsed and the pump parts in their inactive positions.
Figure 5:
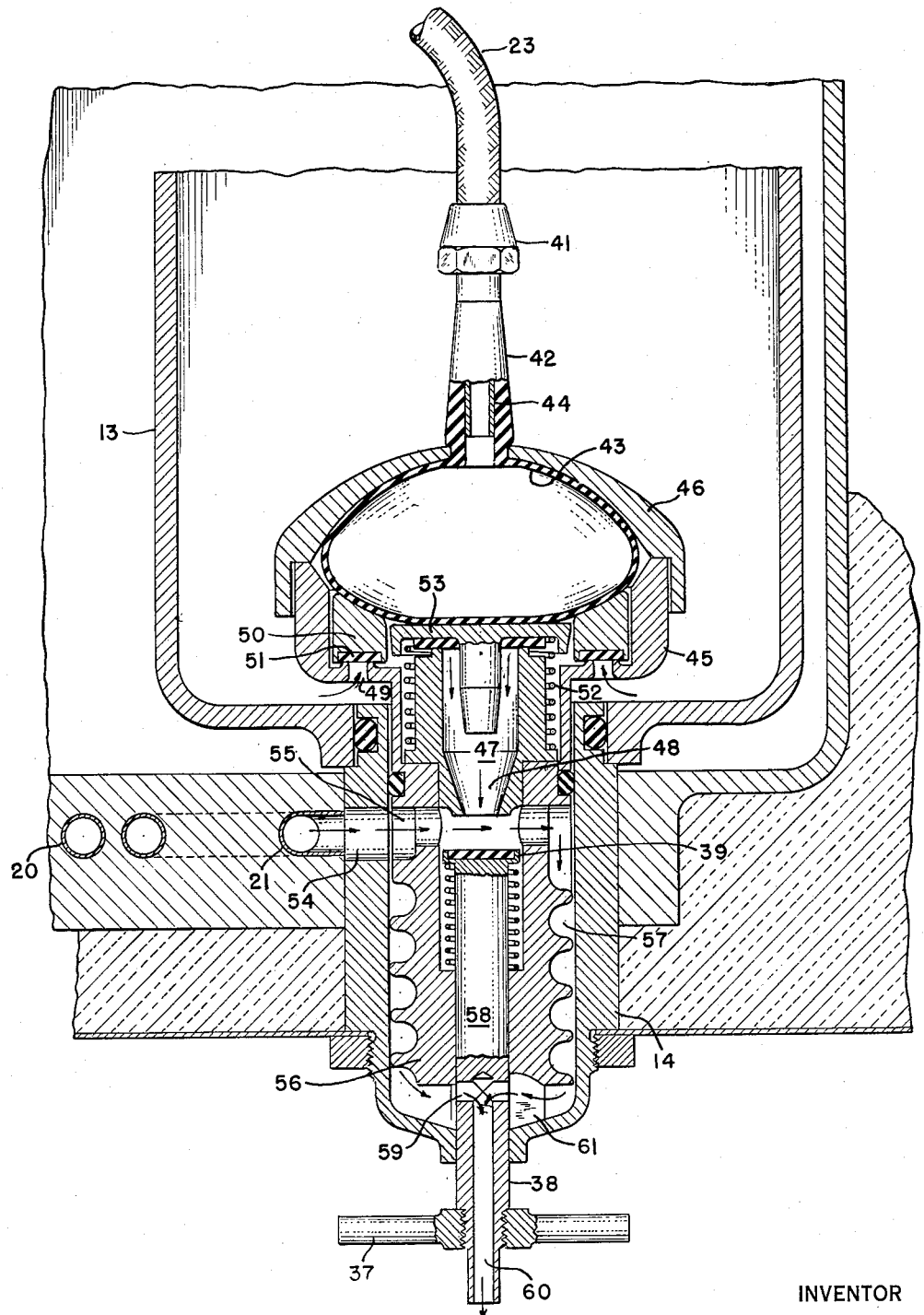
Fig. 5 is a section similar to Fig. 4 but showing the diaphragm expanded and discharging concentrate and the nozzle discharging the mixed beverage.

In the drawings, a dispensing unit is indicated at 10. This unit comprises an insulated casing 11 which may be mounted on a fountain or other suitable horizontal support. A tank 12 within the casing provides refrigeration for the concentrate and water. The concentrate or syrup is stored in a separate container 13 disposed within tank 12. The tank 12 may contain either ice or the cooling portion of a mechanical refrigerating system. Both the tank and container are provided with covers or access openings (not shown). A pump and nozzle assembly is disposed partly within the container 13 for dispensing a portion of the concentrate upon each operation of the dispenser. The structure of this assembly is hereafter described.

Referring now to Fig. 1, which is a schematic layout of the system, water under pressure flows from a conduit 15 to a manually-opened water valve assembly 16. Inside this assembly the water flows in two separate paths, one of which leads by a conduit 17 through a pressure-regulating valve 18, here shown as of the weighted type, and then through a conduit 19 to a cooling coil 20. This may be a flat coil cast into a metal body forming at least a portion of the tank 12, or it may be any type of heat exchanger adapted to be in intimate thermal relation with the refrigerating tank 12. Refrigerated water flows from coil 20 to a dispensing nozzle 21 connected to the lower end of pump 14.

The other path of water flow is from valve 16 through conduit 22, which may be of such diameter as to restrict the water flow therethrough and thus regulate its pressure, just as the valve 18 regulates the pressure of the water flowing to the dispensing nozzle. After passing through conduit 22 the water flows through a conduit 23 to one side of a diaphragm provided in the concentrate pump 14.

When the flow of water through the aforesaid system is shut off after a dispensing cycle, the water pressure on the pump diaphragm is relieved and the water in the pump above the diaphragm is forced out of the pump through conduit 23 and a conduit 24 which is connected to the lower part of the casing of the water valve assembly 16.

The waste water then flows past a normally open valve 25 to a discharge conduit 26. The waste water may be drained directly to a sewer or other receptacle or, preferably, it may be conducted by the conduit 26 to the cup platform 27 where it assists in washing away any spillage from the cup. The cup platform is provided with a drain opening 28 through which liquid spilled on it may run off into drain pipe 29.

The flow of water from conduit 15 to the dispenser is controlled through a pair of spaced valves 30 and 31, which are normally seated by springs 32 and 33. Valves 30 and 31 are mounted, together with discharge control valve 25, on a common reciprocating stem 34. Valve 30 controls flow to conduit 22, while valve 31 controls flow to conduit 17.

The lower end of valve stem 34 is movably connected at its lower end to a lever 35 having its pivot at its end 36. This lever extends forwardly beneath the dispenser, engaging a yoke 37 attached to the stem 38 of a normally closed valve 39 (Fig. 3) which controls the flow of concentrate or syrup from the pump 14. A handle 40 is provided at the outer end of lever 35 so that the operator, by depressing the handle 40 and unseating the water valves 30 and 31 and simultaneously closing water discharge valve 25 and opening concentrate valve 39, can dispense a properly mixed drink.

The concentrate or syrup pump and mixing nozzle are shown in detail in Figs. 3 and 4. The pump and nozzle are preferably formed as a unit readily removable from the dispenser. The outer end of conduit 23 is connected by a detachable coupling 41 to the upper end of a small conduit 42 leading to the interior of the pump diaphragm 43. This diaphragm is preferably formed as a hollow flattened flexible ball having an upwardly projecting stem 44 into which the conduit 42 is inserted. The diaphragm is contained in a chamber formed between a pump body 45 and a cap member 46. The body and cap are united by a detachable connection (not shown) such as a bayonet type fastening. Other types of diaphragms may be used to operate the concentrate pump.

The pump body below the diaphragm is provided with a chamber 47 terminating in a discharge port 48 which is normally closed by valve 39. Intake ports 49 for the concentrate are disposed circumferentially around the valve body outside the chamber 47. Concentrate or syrup flow through these ports is controlled by a ring 50 having a smaller ring of pliable material 51 such as rubber, disposed in a groove formed in the under side of ring 50. Ring 50 cooperates with ports to act as a valve controlling flow of concentrate from its storage container 13. It will be noted that the upper part of the valve body 45, including the ports 49, is located within the container 13 so that when the ring is unseated concentrate is permitted to flow through the ports 49 to the space including the chamber 47, below the collapsed diaphragm 43.

The upper surface of ring 50 is made concave to conform with the surface of diaphragm 43 when the latter is expanded. A spring 52 bearing against a plate 53 in contact with the lower surface of the diaphragm maintains the diaphragm normally in the collapsed position shown in Fig. 4. The diaphragm is expanded against the force of spring 52 by the pressure of water admitted to the interior of the diaphragm through conduits 23 and 42 when water control valves 30 and 31 are opened. When this is done by lever 35, syrup or concentrate valve 39 is opened simultaneously. Water also flows at this time through conduit 17, cooling coil 20 and conduit 21 through a port 54 provided in the wall of the nozzle body. This port coincides with a transverse passage 55 formed in the nozzle core 56 just below the concentrate port 48 and into which passage the port opens. When the diaphragm is expanded it also seats the ring 50, thus closing the concentrate inlet ports 49 and forcing the concentrate beneath the diaphragm out through port 48 where it is picked up by the water flowing under pressure through transverse passage 55. From this passage the mixture of water and concentrate is directed to the upper end of a helical passageway 57 formed between the outer shell and the core 56 of the nozzle. In its flow through this passageway the concentrate and water are intimately mixed as they flow to the discharge end of the nozzle.

Valve 39 has a stem 58 which is provided with a transverse passage 59 near its lower end. This passage is disposed above the lower end of the nozzle core when the valve 39 is seated. However, when the valve 39 is unseated and stem 58 is moved downwardly, the mixture which has passed through the helical groove 57 enters the passage 59, which is now uncovered, and is discharged through a vertical passage 60 which communicates with transverse passage 59. A plurality of vanes 61, preferably three in number, are provided at the lower end of the spiral or helix 57 to break up the violent whirling motion imparted to the mixture in its passage through the helix and also to assist in completing the mixing step.

It is believed that the operation of the dispenser is readily apparent from the foregoing description. Briefly, it is as follows:

The operator pulls the handle 40 down. This moves lever 35 to open concentrate valve 39 and water valves 30 and 31. Water discharge valve 25 is also closed at this operation. Water under pressure flows from its source through conduit 15 to the water valve assembly 16 and from there it flows in one path through conduit 22 and in another through conduit 17. The water flowing through conduit 22 enters conduit 23 and then flows to the interior of diaphragm 43 which is thereby expanded. This causes ring 50 to seat and close inlet ports 49. Concentrate beneath the diaphragm is forced under pressure through port 48 into passage 55 where it commingles with the water forced from conduit 21 through port 54. The mixing is completed in helix 57 and the mixture is discharged past vanes 61 through passage 60.

When the handle 40 is released, the concentrate and water valves are seated and the diaphragm is collapsed under the influence of spring 52. The water inside the diaphragm is discharged through conduit 23 to conduit 24 and then past valve 25 to conduit 26 as heretofore described.

It is apparent from the foregoing description that the pressure on the concentrate pump is the same as that on the water used in making the completed beverage, so that a uniform mixture is produced at the dispensing nozzle. The ratio of concentrate to water is controlled by the proper proportioning of the conduits and other liquid flow passages.

The terms "concentrate" and "syrup" have been used interchangeably throughout, it being understood that a concentrate is generally used to describe a fruit juice from which a considerable volume of water has been removed, while a syrup is generally a thick sugar in water solution containing selected flavoring matter.

While I have shown my invention in but one form, it will be obvious to those skilled in the art that it is not so limited, but is susceptible of various changes and modifications without departing from the spirit thereof.

What is claimed is:

1. A beverage dispensing system comprising a source of water under pressure, a source of flavoring concentrate under atmospheric pressure, means for periodically applying pressure to a predetermined quantity of the concentrate to be dispensed, means including a pressure-regulating conduit disposed between the water flow control means and the means for applying pressure to the concentrate for causing water pressure to be applied to the last-named means only when the water flow control means is opened, whereby to cause water and concentrate to be dispensed as a uniform mixture at the dispensing nozzle, and means including a conduit connected to the first-named conduit and provided with a valve means controlled simultaneously with the water flow control means for relieving the water pressure on the means for applying pressure to the concentrate after the dispensing operation is completed.

2. Structure according to claim 1 in which waste water is first directed over a platform disposed below the dispensing nozzle on which a beverage receptacle is placed.

3. A nozzle assembly for dispensing a uniformly mixed beverage having water and flavoring concentrate components, said assembly having a passage extending transversely across the inlet end of the nozzle for admitting water under pressure, a port disposed substantially at right angle to the aforesaid passage for admitting concentrate under pressure into the water flowing through said passage, and a helical concentrate and water mixing passageway beginning at a point beyond the junction of the water and concentrate and terminating at a point adjacent the discharge end of the nozzle.

4. Structure according to claim 3 in which a plurality of vertical vanes are provided between the discharge end of the helical passageway and the discharge end of the nozzle to straighten out the beverage after its whirling passage through the helical passageway.

References Cited in the file of this patent

UNITED STATES PATENTS

| | | |
|---|---|---|
| 2,372,360 | Cornelius | Mar. 27, 1945 |
| 2,427,429 | Waite et al. | Sept. 16, 1947 |
| 2,502,610 | Wegman | Apr. 4, 1950 |
| 2,526,331 | Copping | Oct. 17, 1950 |
| 2,537,119 | Bauerlein et al. | Jan. 9, 1951 |
| 2,585,172 | Reynolds | Feb. 12, 1952 |